US008485428B1

(12) United States Patent
Barker et al.

(10) Patent No.: US 8,485,428 B1
(45) Date of Patent: *Jul. 16, 2013

(54) SYSTEMS AND METHODS FOR PROVIDING SECURITY INFORMATION ABOUT QUICK RESPONSE CODES

(75) Inventors: Clifton Barker, Austin, TX (US); Shaun Cooley, El Segundo, CA (US); Chandrasekhar Cidambi, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/044,855

(22) Filed: Mar. 10, 2011

(51) Int. Cl.
G06F 17/00 (2006.01)
G06F 21/00 (2006.01)

(52) U.S. Cl.
USPC .............................. 235/375; 726/22; 726/24

(58) Field of Classification Search
USPC ..................... 235/494; 709/202; 726/22, 24
See application file for complete search history.

(56) References Cited

U.S. PATENT DOCUMENTS

| 7,269,851 | B2 | 9/2007 | Ackroyd |
| 7,510,125 | B2 | 3/2009 | Look |
| 7,537,162 | B1 * | 5/2009 | Siu ........................... 235/462.01 |
| 7,831,412 | B1 | 11/2010 | Sobel |
| 7,966,278 | B1 | 6/2011 | Satish |
| 8,079,087 | B1 * | 12/2011 | Spies et al. ...................... 726/26 |
| 8,225,406 | B1 | 7/2012 | Nachenberg |
| 8,255,902 | B1 | 8/2012 | Satish |
| 2003/0217267 | A1 * | 11/2003 | Kindberg ...................... 713/168 |
| 2005/0283831 | A1 | 12/2005 | Ryu et al. |
| 2006/0098241 | A1 * | 5/2006 | Cheong et al. ................ 358/463 |
| 2006/0253584 | A1 | 11/2006 | Dixon et al. |
| 2008/0301802 | A1 * | 12/2008 | Bates et al. ..................... 726/16 |
| 2012/0102087 | A1 * | 4/2012 | Chor ............................. 709/202 |
| 2012/0284105 | A1 | 11/2012 | Li |

OTHER PUBLICATIONS

Chandrasekhar Cidambi; U.S. Appl. No. 12/982,855; Systems and Methods for Providing Security Information About Quick Response Codes, filed Dec. 30, 2010.
Chandrasekhar Cidambi; U.S. Appl. No. 13/044,877; Systems and Methods for Providing Security Information About Quick Response Codes, filed Mar. 10, 2011.
Sourabh Satish et al.; Social Trust Based Security Model; U.S. Appl. No. 11/394,846, filed Mar. 31, 2006.

* cited by examiner

Primary Examiner — Thien M Le
Assistant Examiner — Claude J Brown
(74) Attorney, Agent, or Firm — ALG Intellectual Property, LLC

(57) ABSTRACT

A computer-implemented method for providing security information about quick response codes may include (1) identifying an image captured by a mobile device including a matrix barcode, (2) determining that the matrix barcode includes a link to an Internet resource, (3) determining the trustworthiness of the Internet resource referenced by the matrix barcode, and then (4) augmenting the image with a visual augmentation that is based at least in part on the trustworthiness of the Internet resource. Various other methods, systems, and computer-readable media are also disclosed.

20 Claims, 8 Drawing Sheets

400

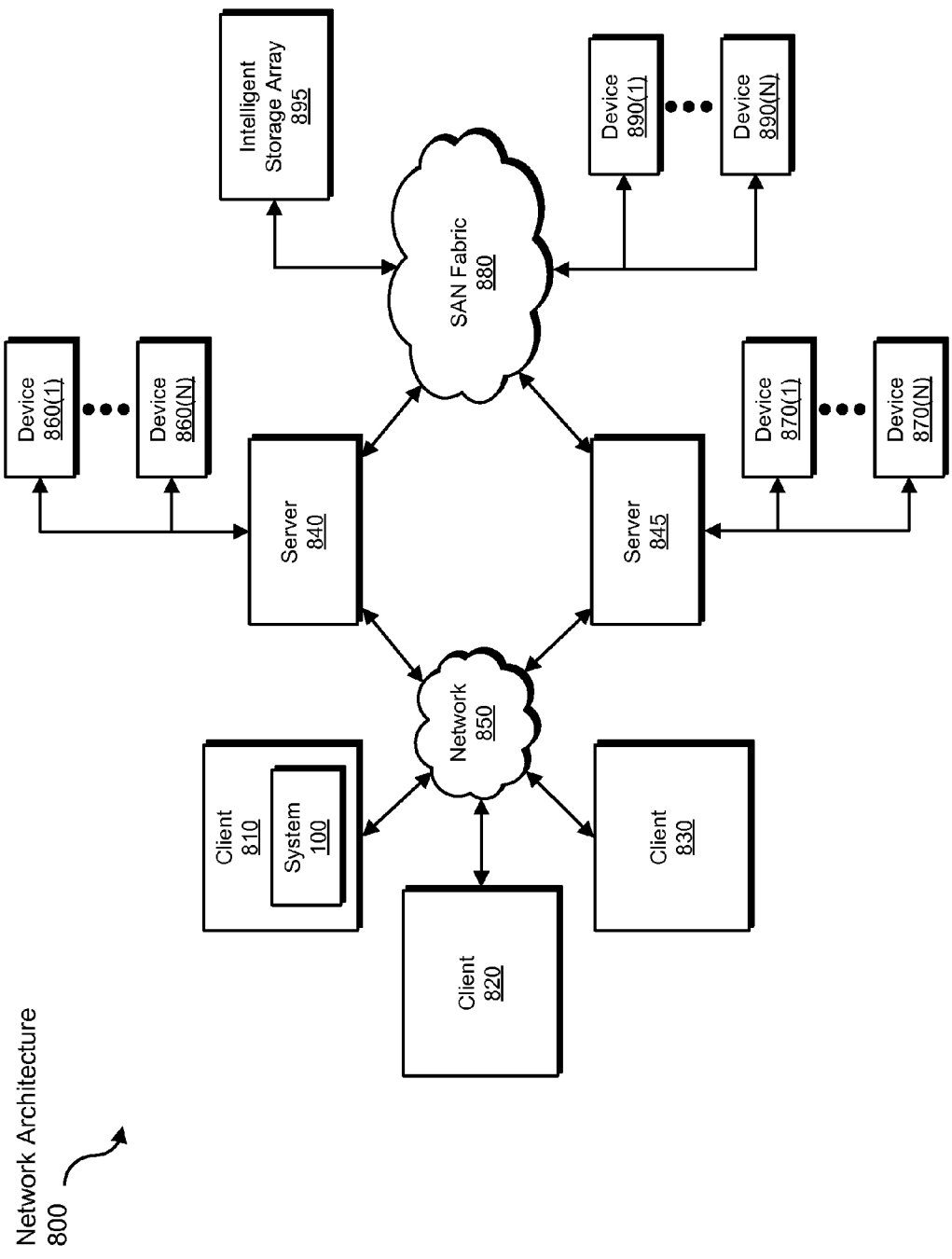

SYSTEMS AND METHODS FOR PROVIDING SECURITY INFORMATION ABOUT QUICK RESPONSE CODES

BACKGROUND

With the rise of mobile computing, consumers may now access the Internet from anywhere. Furthermore, matrix barcodes, such as quick response codes ("QR codes") may facilitate the quick entry of information into mobile computing devices. For example, a smartphone may include a digital camera capable of capturing an image of a matrix barcode. In this example, the smartphone may decode the captured matrix barcode into a uniform resource identifier and load a corresponding web page in the smartphone's browser.

Unfortunately, matrix barcodes may sometimes reference malicious websites, which may be used to steal confidential information (e.g., user credentials or credit card numbers) as part of a phishing attack or exploit vulnerabilities in mobile web browser software that may allow malware to be downloaded to a user's mobile computing device. Furthermore, some legitimate Internet resources (through the use of spam, comment posts, etc.) may be used to redirect users to malicious websites. Accordingly, the instant disclosure identifies a need for systems and methods for providing security information about quick response codes.

SUMMARY

As will be described in greater detail below, the instant disclosure generally relates to systems and methods for providing security information about quick response codes by visually augmenting quick response codes based on the trustworthiness of the Internet resources that they reference. In some examples, the systems described herein may accomplish such a task by (1) identifying an image captured by a mobile device that includes a matrix barcode, (2) determining that the matrix barcode includes a link to an Internet resource, (3) determining the trustworthiness of the Internet resource referenced by the matrix barcode, and then (4) augmenting the image with a visual augmentation that is based at least in part on the trustworthiness of the Internet resource.

The systems described herein may identify the image in a variety of contexts. In one example, these systems may identify a photograph including the matrix barcode. Additionally or alternatively, these systems may identify a video stream including the matrix barcode. In some examples, the matrix barcode may include a quick response code.

Determining the trustworthiness of the Internet resource may include any of a variety of outcomes. For example, determining the trustworthiness of the Internet resource may include (1) determining that the Internet resource is malicious, (2) determining that the Internet resource is not malicious, (3) determining that the trustworthiness of the Internet resource is unknown, and/or (4) identifying a reputation score of the Internet resource.

The visual augmentation may include any of a variety of features. For example, the visual augmentation may include a colored border around the matrix barcode. In some examples, the visual augmentation may include a colored background and/or a flashing background added to the matrix barcode. Additionally or alternatively, the visual augmentation may include a watermark on the matrix barcode and/or text accompanying the matrix barcode.

In some examples, the systems described herein may (1) identify an attempt to access the Internet resource, (2) determine that the Internet resource is not trustworthy, and then (3) present an interface element warning that the Internet resource is not trustworthy and requiring confirmation to proceed. In these examples, the interface element may provide access to information explaining the determination of trustworthiness.

As will be explained in greater detail below, by visually augmenting matrix barcodes with information relating to the trustworthiness of Internet resources referenced by the matrix barcodes, the systems and methods described herein may effectively warn and/or prevent users from inadvertently loading referenced malicious Internet resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 is a block diagram of an exemplary computing network capable of implementing one or more of the embodiments described and/or illustrated herein.

Figure 1:
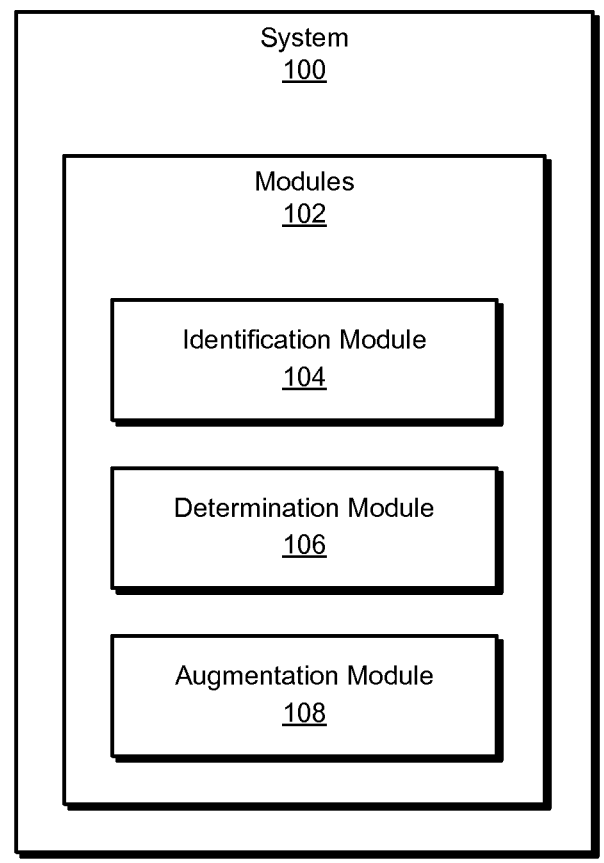
FIG. 1 is a block diagram of an exemplary system for providing security information about quick response codes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
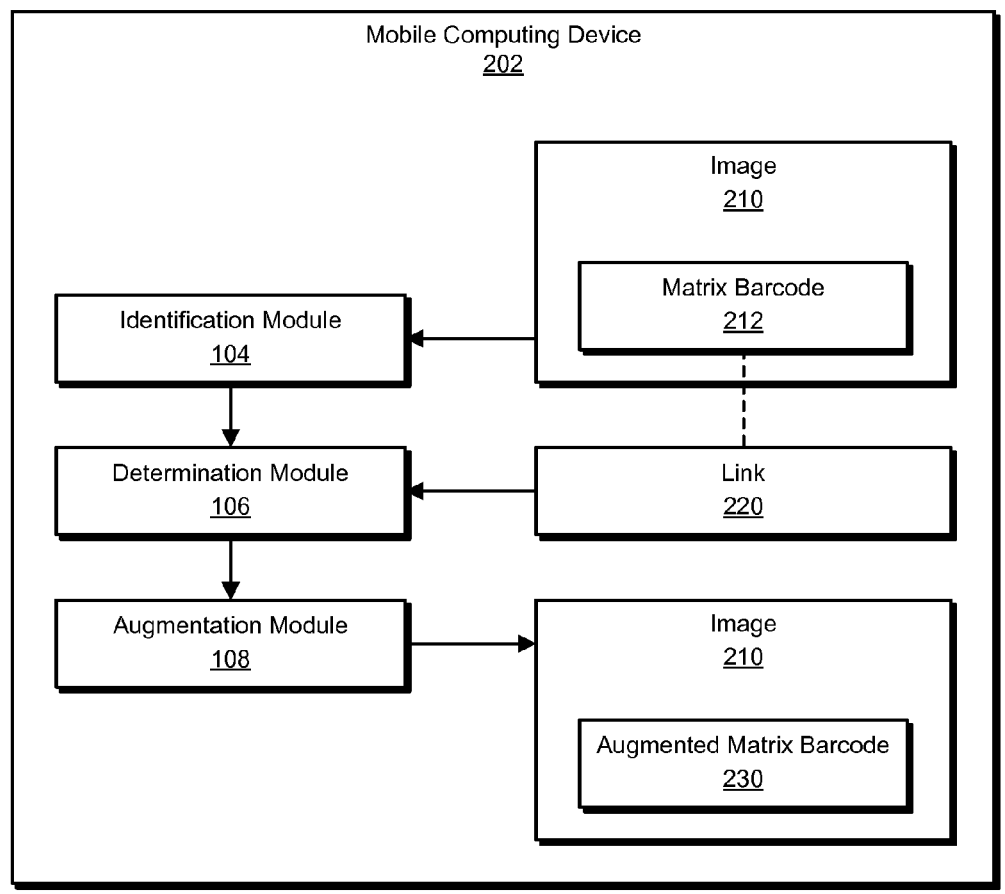
FIG. 2 is a block diagram of an exemplary system for providing security information about quick response codes.

The following will provide, with reference to FIGS. 1-2, detailed descriptions of exemplary systems for providing security information about quick response codes. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for providing security information about quick response codes. As illustrated in this figure, exemplary system 100 may include one or more modules 102 for performing one or more tasks. For example, and as will be explained in greater detail below, exemplary system 100 may include an identification module 104 programmed to identify an image captured by a mobile device that includes a matrix barcode. Exemplary system 100 may also include a determination module 106 programmed to (1) determine that the matrix barcode includes a link to an Internet resource and (2) determine the trustworthiness of the Internet resource referenced by the matrix barcode.

In addition, and as will be described in greater detail below, exemplary system 100 may include an augmentation module 108 programmed to augment the image with a visual augmentation that is based at least in part on the trustworthiness of the Internet resource. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as mobile computing device 202 illustrated in FIG. 2, computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a mobile computing device 202 with an image 210 including a matrix barcode 212. In one embodiment, and as will be described in greater detail below, one or more of modules 102 from FIG. 1 may program mobile computing device 202 to visually augment image 210 by (1) identifying an image captured by a mobile device including a matrix barcode (e.g., image 210 including matrix barcode 212 captured by mobile computing device 202), (2) determining that the matrix barcode includes a link to an Internet resource (e.g., a link 220), (3) determining the trustworthiness of the Internet resource referenced by the matrix barcode (e.g., the trustworthiness of the Internet resource referenced by link 220), and then (4) augmenting the image with a visual augmentation that is based at least in part on the trustworthiness of the Internet resource (e.g., creating an augmented matrix barcode 230).

Mobile computing device 202 generally represents any type or form of computing device capable of reading computer-executable instructions. Examples of mobile computing device 202 include, without limitation, cellular phones, personal digital assistants (PDAs), tablet computers, laptops, multimedia players, embedded systems, combinations of one or more of the same, exemplary computing system 710 in FIG. 7, or any other suitable computing device.

Figure 3:
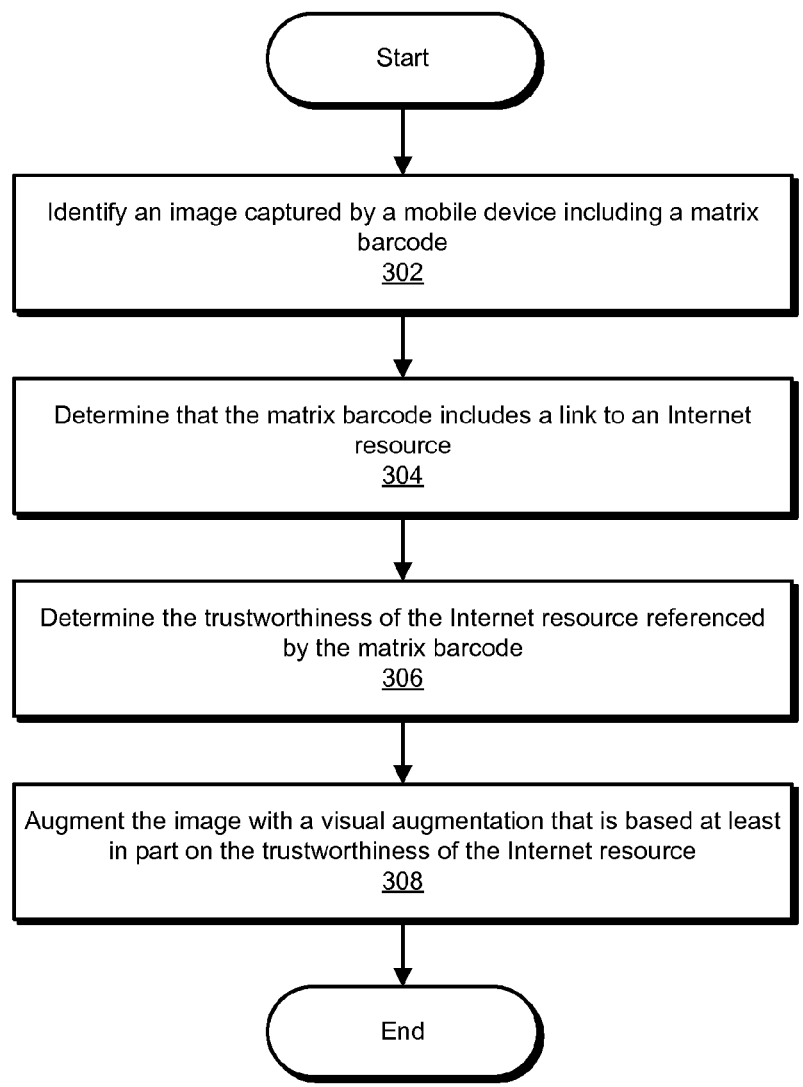
FIG. 3 is a flow diagram of an exemplary method for providing security information about quick response codes.

FIG. 3 is a flow diagram of an exemplary computer-implemented method 300 for providing security information about quick response codes. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an image captured by a mobile device including a matrix barcode. For example, at step 302 identification module 104 may, as part of mobile computing device 202 in FIG. 2, identify an image 210 captured by mobile computing device 202 that includes matrix barcode 212.

Figure 4:
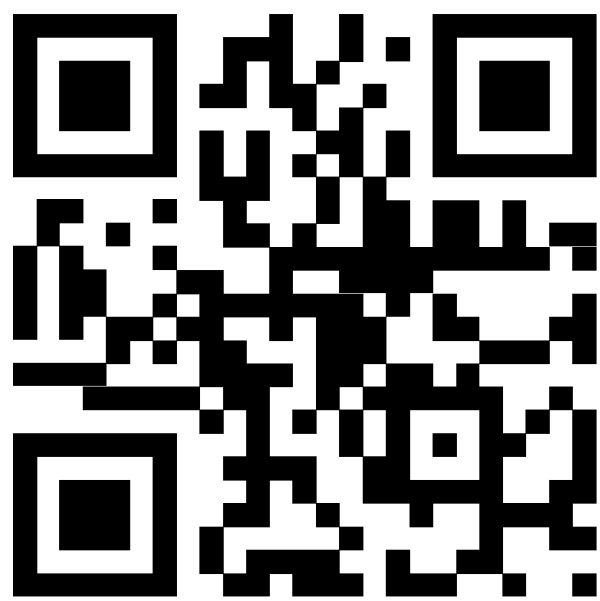
FIG. 4 is a diagram of an exemplary quick response code.

As used herein, the phrase "matrix barcode" may refer to any visual, machine-readable representation of data. A matrix barcode may encode a variety of information. For example, as will be described in greater detail below, a matrix barcode may encode a link to an Internet resource. In some examples, the phrase "matrix barcode" may refer to a two-dimensional code. For example, the phrase "matrix barcode" may refer to a Quick Response code. Additionally or alternatively, examples of matrix barcodes may include an Aztec Code, a CyberCode, a Data Matrix, an EZcode, and a Mobile Multi-Coloured Composite. In some examples, the phrase "matrix barcode" may refer to non-square two-dimensional barcodes. For example, "matrix barcode" may refer to a two-dimensional barcode without square pixels such as a High Capacity Color Barcode or may refer to a circular barcode such as a ShotCode. Quick response code 400 in FIG. 4 is an illustration of an exemplary matrix barcode.

Identification module 104 may identify the image in step 302 of FIG. 3 in a variety of contexts. In one example, identification module 104 may identify a photograph including the matrix barcode. As used herein, the term "photograph" may refer to any digital image, including an image captured by a digital camera. For example, identification module 104 may operate on a mobile computing device with a digital camera. Accordingly, identifying module 104 may identify the image including the matrix barcode by identifying the photograph and scanning the photograph for the matrix barcode. Additionally or alternatively, identification module 104 may identify the image as including the matrix barcode by identifying metadata associated with the photograph that identifies the matrix barcode within the photograph.

In some examples, identification module 104 may identify a video stream including the matrix barcode. As used herein, the phrase "video stream" may refer to any stream and/or file including digital video data. In some examples, identification module 104 may operate on a mobile computing device with a digital camera. Accordingly, identifying module 104 may identify the image by identifying the video stream and analyzing the video stream for one or more frames including the matrix barcode. Additionally or alternatively, identification module 104 may identify the image including the matrix barcode by identifying metadata associated with the video stream that identifies the matrix barcode within the video stream (e.g., by identifying frames that include the matrix barcode). In some examples, the video stream may include a real-time video stream captured by a digital camera of a mobile computing device. Additionally or alternatively, the video stream may include a video file.

In some examples, the mobile device may include a digital scanner (e.g., a barcode scanner). In these examples, the mobile device may create an image after scanning the matrix barcode. Accordingly, identification module 104 may identify the image representing the scan of the matrix barcode.

Returning to FIG. 3, at step 304 one or more of the systems described herein may determine that the matrix barcode includes a link to an Internet resource. For example, at step 304 determination module 106 may, as part of mobile computing device 202 in FIG. 2, determine that matrix barcode 212 includes link 220. Using FIG. 4 as an additional example, at step 304 determination module 106 may determine that matrix barcode 400 includes a link to http://example.com.

As used herein, the term "link" may refer to any hyperlink, address, and/or reference to an Internet resource. For example, a "link" may refer to a universal resource identifier. Additionally or alternatively, the link may include to an IP address. In some examples, the link may include an explicit reference to an Internet resource. Additionally or alternative, the link may include a plain-text reference to an Internet resource and/or an implicit reference to an Internet resource. For example, the link may include a signature, index number, and/or other identifier that corresponds to a universal resource identifier.

As used herein, the phrase "Internet resource" may include any file, document (e.g., an HTML document), executable object, service, and/or collection thereof. Generally, the phrase "Internet resource" may refer to any resource on the Internet which may be referenced by a matrix barcode.

Determination module 106 may determine that the matrix barcode includes the link to the Internet resource in any suitable manner. For example, determination module 106 may decode the matrix barcode to identify the link. Additionally or alternatively, determination module 106 may identify metadata associated with the matrix barcode that identifies the link within the matrix barcode.

Returning to FIG. 3, at step 306 one or more of the systems described herein may determine the trustworthiness of the Internet resource referenced by the matrix barcode. For example, at step 306 determination module 106 may, as part of mobile computing device 202 in FIG. 2, determine the trustworthiness of the Internet resource referenced by matrix barcode 212 via link 220. Using FIG. 4 as an additional example, at step 306 determination module 106 may determine the trustworthiness of http://example.com.

Determination module 106 may arrive at any of a variety of outcomes when determining the trustworthiness of the Internet resource. In one example, determination module 106 may determine that the Internet resource is malicious. For example, determination module 106 may determine that the Internet resource is associated with malware (e.g., determination module 106 may determine that accessing, retrieving, displaying, and/or using the Internet resource may expose a computing device to malware). Additionally or alternatively, determination module 106 may determine that the Internet resource is associated with a phishing attack (e.g., determination module 106 may determine that the Internet resource is designed to deceptively acquire confidential information). In some examples, determination module 106 may determine that the Internet resource is malicious by determining that the Internet resource contains illicit and/or unwanted content. Additionally or alternatively, determination module 106 may determine that the Internet resource is malicious by determining that accessing the Internet resource creates an unwanted result (e.g., interferes with Internet service).

In some examples, determination module 106 may determine that the Internet resource is not malicious. For example, determination module 106 may determine that the Internet resource is not associated with malware, phishing, unwanted content, and/or unwanted results. In additional examples, determination module 106 may determine that the trustworthiness of the Internet resource is unknown. For example, determination module 106 may determine that insufficient information is available to assess the trustworthiness of the Internet resource.

In some examples, determination module 106 may determine the trustworthiness of the Internet resource by identifying a reputation score of the Internet resource. The term "reputation score," as used herein, generally refers to information that conveys the opinion of a specific community (such as the user base of a security-software publisher) on the trustworthiness or legitimacy of an Internet resource and/or content associated with the Internet resource. Examples of reputation scores include, without limitation, numerical scores (where, for example, high reputation scores indicate that an Internet resource is generally trusted within a community and low reputation scores indicate that an Internet resource is generally untrusted within a community), prevalence information (e.g., information that identifies the number or percentage of devices and/or web pages within a community that (1) access the Internet resource, (2) link to the Internet resource and/or (3) contain files obtained from the Internet resource), or any other information that may be used to identify a community's opinion on the trustworthiness of the Internet resource.

Determination module 106 may perform step 306 in a variety of ways. For example, determination module 106 may retrieve information related to the trustworthiness of the Internet resource from a third party. For example, determination module 106 may transmit the link to the Internet resource to a security vendor server and receive information from the security vendor server relating to the trustworthiness of the Internet resource. Additionally or alternatively, determination module 106 may examine the link to the Internet resource and/or the content of the Internet resource to evaluate the trustworthiness of the Internet resource.

Returning to FIG. 3, at step 308 one or more of the systems described herein may augment the image with a visual augmentation that is based at least in part on the trustworthiness of the Internet resource. For example, at step 308 augmentation module 108 may, as part of mobile computing device 202 in FIG. 2, augment image 210 with a visual augmentation based on the trustworthiness of the Internet resource of link 220, resulting in image 210 including augmented matrix barcode 230.

Figure 5:
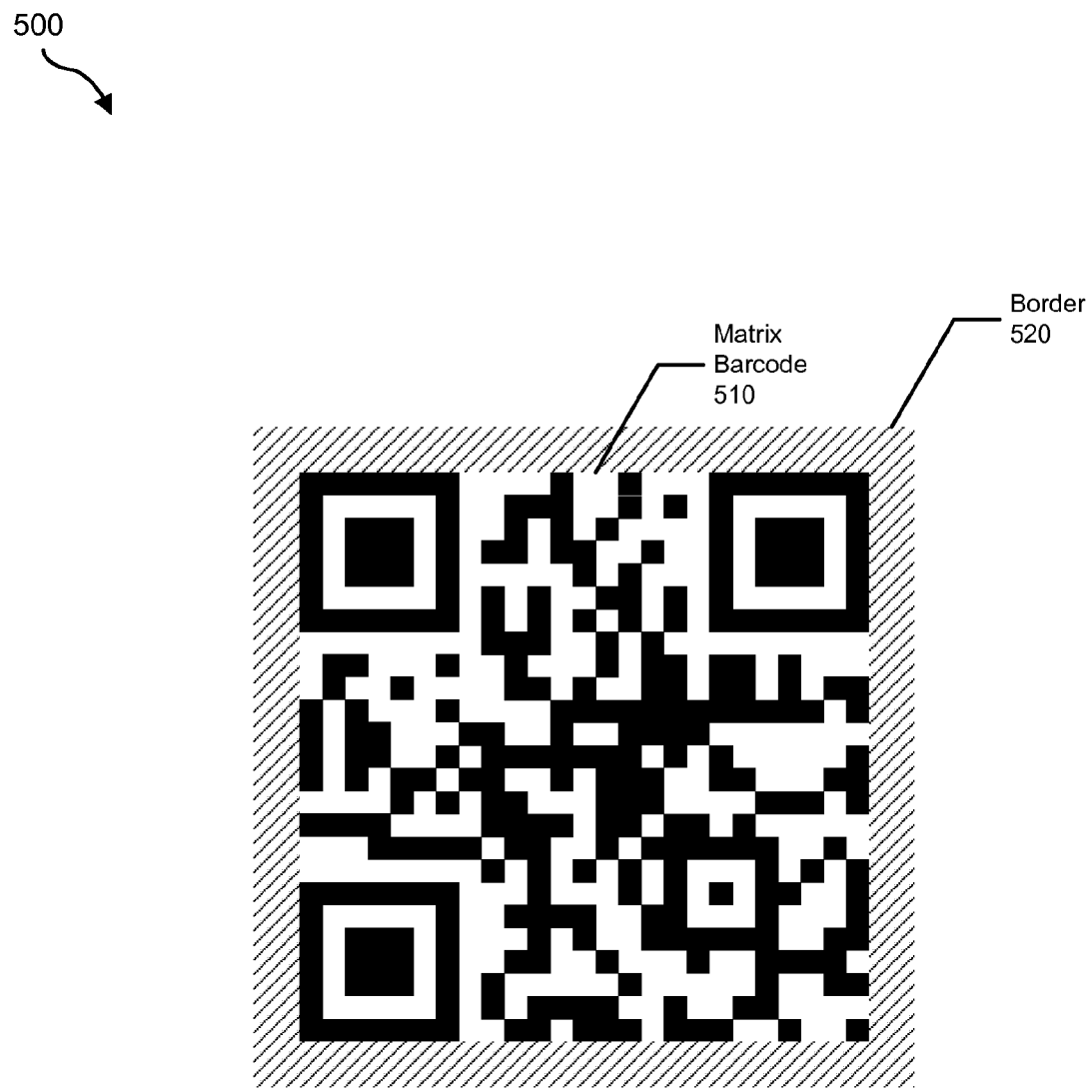
FIG. 5 is a diagram of an exemplary augmented quick response code.

As used herein, the phrase "visual augmentation" may refer to any visible addition and/or modification. In some examples, the visual augmentation may include a colored border around the matrix barcode. For example, FIG. 5 illustrates an exemplary augmented matrix barcode 500. As shown in FIG. 5, augmented matrix barcode 500 may include a matrix barcode 510 surrounded by a border 520. In this example, the color of border 520 may depend on the trustworthiness of the Internet resource (e.g., http://example.com). For example, if determination module 106 determined that the Internet resource is malicious, augmentation module 108 may augment matrix barcode 510 with a red border 520. If determination module 106 determined that the Internet resource is not malicious, augmentation module 108 may augment matrix barcode 510 with a green border 520. If determination module 106 determined that the trustworthiness of the Internet resource is unknown, augmentation module 108 may augment matrix barcode 510 with a yellow border 520. If determination module 106 determined the trustworthiness of the Internet resource by identifying a reputation score, augmentation module 108 may select the color of the border 520 by mapping the reputation score onto a gradient color palette.

In some examples, the visual augmentation also may include a colored background added to the matrix barcode. For example, augmentation module 108 may replace white and/or blank elements of the matrix barcode with red if the Internet resource is malicious. Likewise, the visual augmentation may include a flashing background added to the matrix barcode. For example, augmentation module 108 may alternately leave white and/or blank elements of the matrix barcode intact and replace these elements with red if the Internet resource is malicious. In another example, the visual augmentation may include a watermark superimposed on the matrix barcode. For example, augmentation module 108 may superimpose a translucent red "X" on the matrix barcode if the Internet resource is malicious. In some examples, the visual augmentation may include text accompanying the matrix barcode. For example, augmentation module 108 may place text adjacent to the matrix barcode, such as "WARNING," "SAFE," "VERIFIED," etc. In some examples, the text may include the reputation score of the Internet resource.

Augmentation module 108 may perform step 308 in a variety of ways. For example, augmentation module 108 may modify an image of the matrix barcode to incorporate the visual augmentation. Additionally or alternatively, augmentation module 108 may add and/or overlay the visual augmentation as a separate element of a document and/or media file including the matrix barcode.

As mentioned earlier, identification module 104 may identify the image in a variety of contexts. Likewise, augmentation module 108 may augment the image in a variety of contexts. For example, augmentation module 108 may operate as part of a mobile computing device. In this example, augmentation module 108 may add the visual augmentation to a photograph of the matrix barcode. Additionally or alternatively, augmentation module 108 may add the visual augmentation to one or more frames of a video stream including the matrix barcode. In these examples, augmentation module 108 may assess and/or retrieve geometric projection information relating to the matrix barcode in order to correctly apply the visual augmentation to the matrix barcode (e.g., if the matrix barcode is displayed at an angle within a digital image and/or frame of a video stream, augmentation module 108 may map the visual augmentation to the matrix barcode as displayed).

In some examples, augmentation module 108 may also identify an attempt to access the Internet resource and determine that the Internet resource is not trustworthy. In these examples, augmentation module 108 may then present an interface element warning that the Internet resource is not trustworthy and requiring confirmation to proceed. For example, an image viewer on the mobile device may allow access to links within matrix barcodes (e.g., by tapping on the matrix barcode). Augmentation module 108 may detect an attempt to access the Internet resource through the matrix barcode and spawn a pop-up box and/or a dialog box explaining that the link is unsafe. The dialog box may include a button allowing a user to proceed to the Internet resource and/or a button allowing the user to cancel the attempt to access the Internet resource. In some examples, the interface element may also provide access to information explaining the determination of trustworthiness. For example, the dialog box may also include a button allowing the user to see a reputation score of the Internet resource, to see information used to classify the Internet resource, and/or to see an explanation of a reputation system used to classify the Internet resource.

Figure 6:
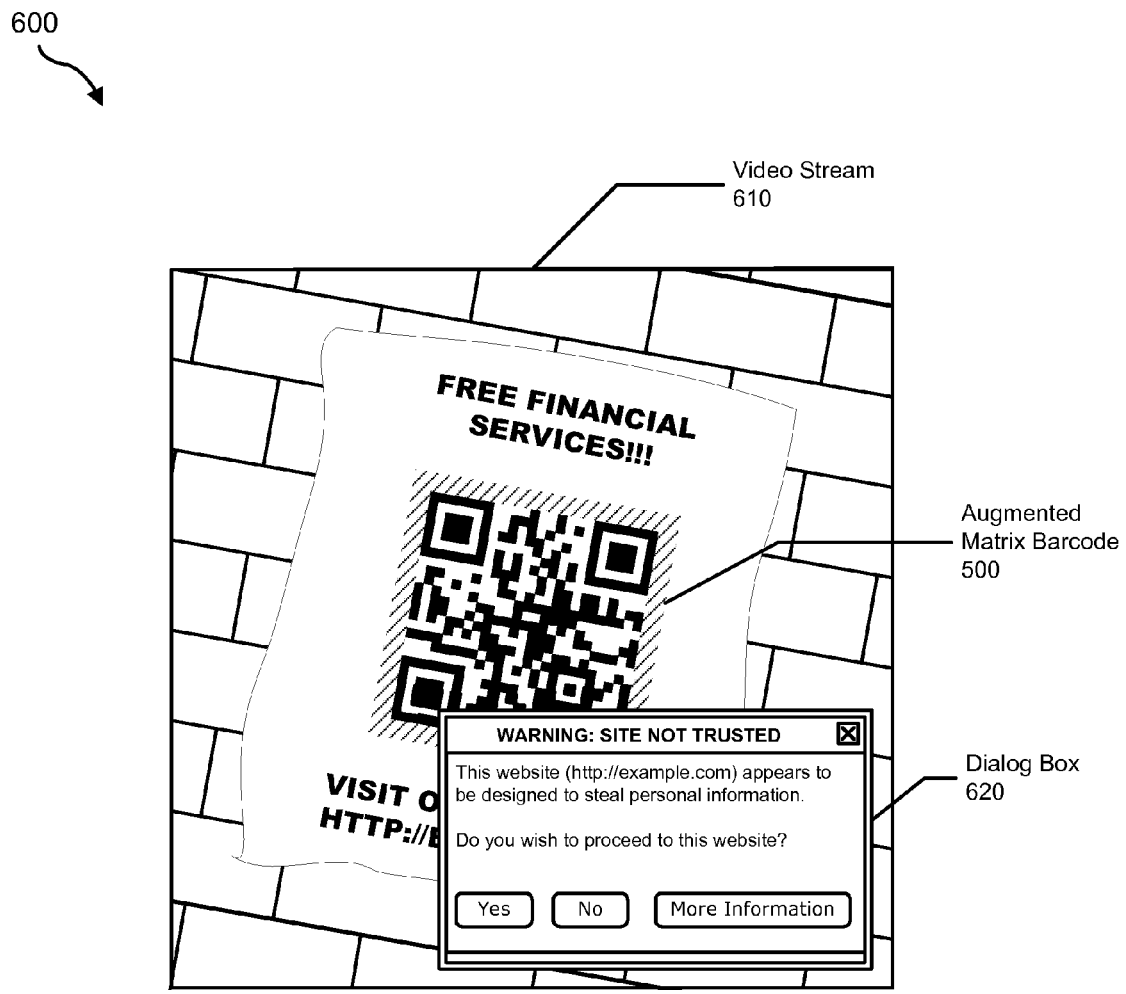
FIG. 6 is a diagram of an exemplary graphical interface for providing security information about quick response codes.

FIG. 6 illustrates an exemplary graphical interface 600 for providing security information about quick response codes. As shown in FIG. 6, exemplary graphical interface 600 may include a video stream 610 that includes an image of a matrix barcode (e.g., matrix barcode 400). Identification module 104 may identify video stream 610 and/or one or more frames of video stream 610. Identification module 104 may also identify matrix barcode 400 within video stream 610. Determination module 106 may determine that an Internet resource linked to by matrix barcode is malicious. Augmentation module 108 may accordingly augment video stream 610 by augmenting matrix barcode 400 within video stream 610, resulting in augmented matrix barcode 500. In some examples, augmentation module 108 may detect an attempt to access the Internet resource and create a dialog box 620 warning of the Internet resource. Dialog box 620 may allow a user to proceed to the Internet resource, cancel the attempt to access the Internet resource, and/or proceed to further information about the Internet resource and/or the potential maliciousness of the Internet resource.

As explained above, by visually augmenting matrix barcodes with information relating to the trustworthiness of Internet resources referenced by the matrix barcodes, the systems and methods described herein may effectively warn and/or prevent users from inadvertently loading referenced malicious Internet resources.

Figure 7:
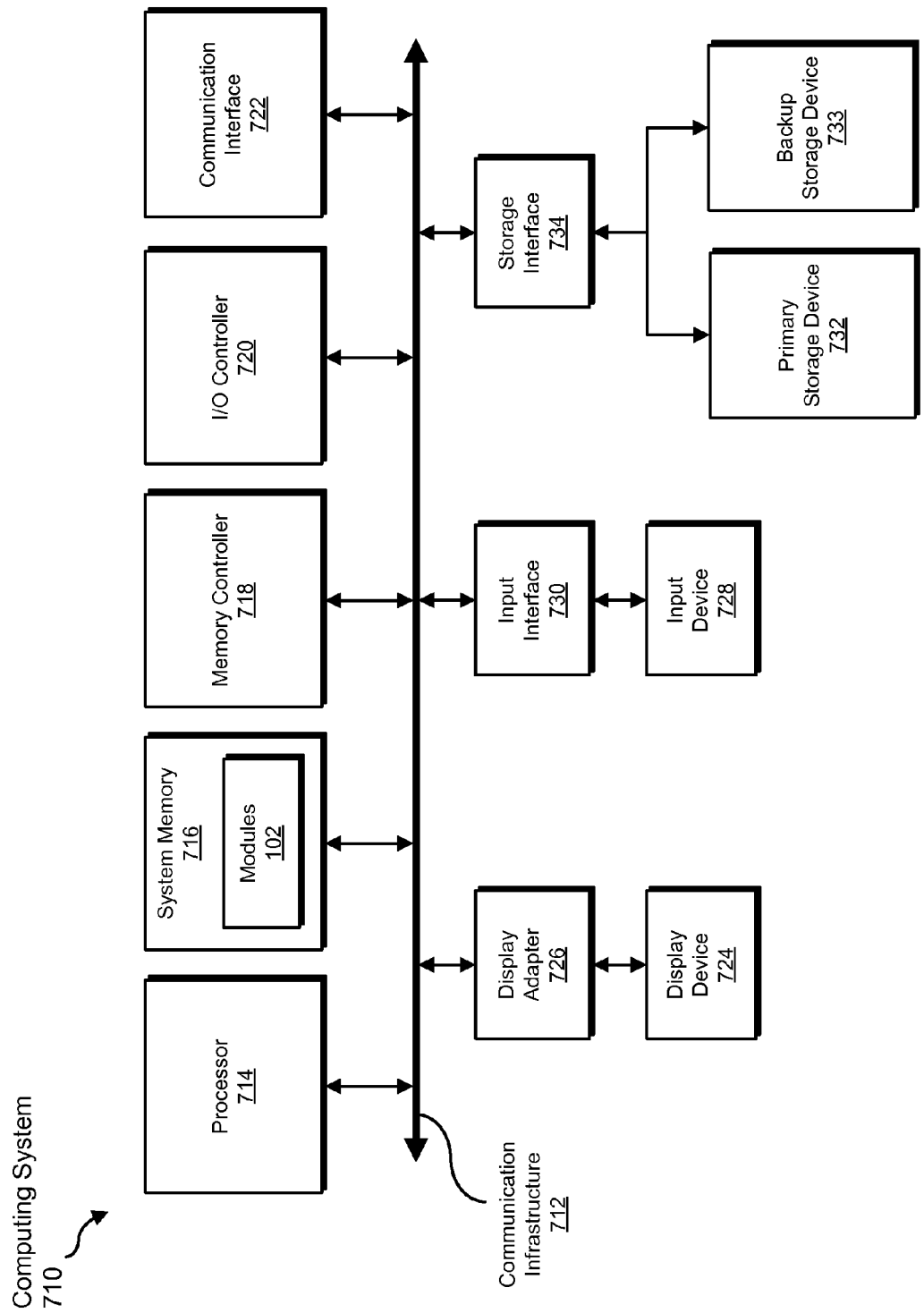
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, and/or augmenting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, determining, and/or augmenting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, and/or augmenting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, and/or augmenting steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, and/or augmenting steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, determining, and/or augmenting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, and/or augmenting steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for providing security information about quick response codes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more modules described herein may transform a matrix barcode into an augmented matrix barcode providing security information. As another example, one or more modules described herein may transform a system for displaying matrix barcodes into a system for displaying augmented matrix barcodes that provide security information. As an additional example, one or more modules described herein may transform a system for capturing and interpreting matrix barcodes into a system for displaying augmented matrix barcodes that provide security information.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing security information about quick response codes, at least a portion of the method being performed by a mobile computing device comprising at least one processor, the method comprising:
    identifying a digital image captured by a digital camera of the mobile computing device, wherein the digital image comprises a matrix barcode;
    determining that the matrix barcode comprises a link to an Internet resource;
    determining the trustworthiness of the Internet resource referenced by the matrix barcode;
    overlaying the digital image with a visual augmentation that is based at least in part on the trustworthiness of the Internet resource;
    displaying the augmented digital image on a graphical interface element of the mobile computing device.

2. The computer-implemented method of claim 1, wherein identifying the digital image comprises identifying a video stream comprising the matrix barcode.

3. The computer-implemented method of claim 1, wherein identifying the digital image comprises identifying a digital photograph comprising the matrix barcode.

4. The computer-implemented method of claim 1, wherein the matrix barcode comprises a quick response code.

5. The computer-implemented method of claim 1, wherein the visual augmentation comprises at least one of:
    a colored border around the matrix barcode;
    a colored background added to the matrix barcode;
    a flashing background added to the matrix barcode.

6. The computer-implemented method of claim 1, wherein the visual augmentation comprises a watermark on the matrix barcode.

7. The computer-implemented method of claim 1, wherein the visual augmentation comprises text overlaying the matrix barcode.

8. The computer-implemented method of claim 1, wherein determining the trustworthiness of the Internet resource comprises at least one of:
    determining that the Internet resource is malicious;
    determining that the Internet resource is not malicious;
    determining that the trustworthiness of the Internet resource is unknown;
    identifying a reputation score of the Internet resource.

9. The computer-implemented method of claim 1, further comprising:
    identifying an attempt to access the Internet resource;
    determining that the Internet resource is not trustworthy;
    wherein displaying the augmented digital image comprises:
        presenting an interface element warning that the Internet resource is not trustworthy;
        requiring confirmation to proceed.

10. The computer-implemented method of claim 9, wherein the interface element provides access to information explaining the determination of trustworthiness.

11. A system for providing security information about quick response codes, the system comprising:
    an identification module programmed to identify a digital image captured by a digital camera of a mobile computing device, wherein the digital image comprises a matrix barcode;
    a determination module programmed to:
        determine that the matrix barcode comprises a link to an Internet resource;
        determine the trustworthiness of the Internet resource referenced by the matrix barcode;
    an augmentation module programmed to:
        overlay the digital image with a visual augmentation that is based at least in part on the trustworthiness of the Internet resource;
        display the augmented digital image on a graphical interface element of the mobile computing device;
    at least one processor configured to execute the identification module, the determination module, and the augmentation module.

12. The system of claim 11, wherein the identification module is programmed to identify the digital image by identifying a video stream comprising the matrix barcode.

13. The system of claim 11, wherein the identification module is programmed to identify the digital image by identifying a digital photograph comprising the matrix barcode.

14. The system of claim 11, wherein the matrix barcode comprises a quick response code.

15. The system of claim 11, wherein the visual augmentation comprises at least one of:
   a colored border around the matrix barcode;
   a colored background added to the matrix barcode;
   a flashing background added to the matrix barcode.

16. The system of claim 11, wherein the visual augmentation comprises a watermark on the matrix barcode.

17. The system of claim 11, wherein the visual augmentation comprises text overlaying the matrix barcode.

18. The system of claim 11, wherein the determination module is programmed to determine the trustworthiness of the Internet resource by at least one of:
   determining that the Internet resource is malicious;
   determining that the Internet resource is not malicious;
   determining that the trustworthiness of the Internet resource is unknown;
   identifying a reputation score of the Internet resource.

19. The system of claim 11, wherein the augmentation module is further programmed to:
   identify an attempt to access the Internet resource;
   determine that the Internet resource is not trustworthy;
   wherein the augmentation module displays the augmented digital image by:
      presenting an interface element warning that the Internet resource is not trustworthy;
      requiring confirmation to proceed.

20. A non-transitory computer-readable-storage medium comprising one or more computer-executable instructions that, when executed by at least one processor of a computing device, cause the computing device to:
   identify a digital image captured by a digital camera of a mobile computing device, wherein the digital image comprises a matrix barcode;
   determine that the matrix barcode comprises a link to an Internet resource;
   determine the trustworthiness of the Internet resource referenced by the matrix barcode;
   overlay the digital image with a visual augmentation that is based at least in part on the trustworthiness of the Internet resource;
   display the augmented digital image on a graphical interface element of the mobile computing device.

* * * * *